United States Patent
Anderson

(10) Patent No.: US 10,502,230 B2
(45) Date of Patent: Dec. 10, 2019

(54) INTEGRALLY BLADED ROTOR HAVING DOUBLE FILLET

(71) Applicant: United Technologies Corporation, Farmington, CT (US)

(72) Inventor: Carney R. Anderson, East Haddam, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 184 days.

(21) Appl. No.: 15/652,385

(22) Filed: Jul. 18, 2017

(65) Prior Publication Data

US 2019/0024673 A1 Jan. 24, 2019

(51) Int. Cl.
| | |
|---|---|
| F04D 29/38 | (2006.01) |
| F01D 5/34 | (2006.01) |
| F02C 3/04 | (2006.01) |
| F04D 29/32 | (2006.01) |
| F01D 5/14 | (2006.01) |

(52) U.S. Cl.
CPC ........... *F04D 29/384* (2013.01); *F01D 5/143* (2013.01); *F01D 5/34* (2013.01); *F02C 3/04* (2013.01); *F04D 29/324* (2013.01); *F04D 29/325* (2013.01); *F05D 2220/32* (2013.01); *F05D 2240/301* (2013.01); *F05D 2240/35* (2013.01); *F05D 2250/71* (2013.01)

(58) Field of Classification Search
None
See application file for complete search history.

(56) References Cited

U.S. PATENT DOCUMENTS

| | | | | |
|---|---|---|---|---|
| 5,244,345 A | * | 9/1993 | Curtis | F01D 11/008 416/193 A |
| 6,190,128 B1 | | 2/2001 | Fukuno et al. | |
| 6,478,539 B1 | * | 11/2002 | Trutschel | F01D 5/143 415/223 |
| 6,524,070 B1 | * | 2/2003 | Carter | F01D 5/141 416/193 A |
| 8,721,287 B2 | * | 5/2014 | Billotey | F01D 5/141 415/206 |

(Continued)

FOREIGN PATENT DOCUMENTS

| | | |
|---|---|---|
| EP | 1087100 A2 | 3/2001 |
| EP | 1182328 A2 | 2/2002 |

OTHER PUBLICATIONS

European Search Report for European Application No. 18184314.5-1006, completed Dec. 6, 2018.

*Primary Examiner* — Justin D Seabe
*Assistant Examiner* — Jason A Fountain
(74) *Attorney, Agent, or Firm* — Carlson, Gaskey & Olds, P.C.

(57) ABSTRACT

An integrally bladed rotor according to an example of the present disclosure includes a hub, and a plurality of rotor airfoils integrally formed with the hub, and extending radially outward from an outer platform of the hub. Each rotor airfoil has a main body that extends radially outward from a root to a tip. A first fillet has a first radius that provides a transition from the outer platform of the hub, and a second fillet situated adjacent to and radially outward of the first fillet, that provides a transition between the first fillet and the main body. The second fillet has a second radius that is less than the first radius.

18 Claims, 5 Drawing Sheets

(56) References Cited

U.S. PATENT DOCUMENTS

| | | | |
|---|---|---|---|
| 9,752,587 B2* | 9/2017 | Fishler | F04D 27/0215 |
| 9,890,641 B2* | 2/2018 | Potter | F01D 5/34 |
| 2011/0064583 A1* | 3/2011 | Billotey | F01D 5/141 |
| | | | 416/234 |

* cited by examiner

INTEGRALLY BLADED ROTOR HAVING DOUBLE FILLET

BACKGROUND

This application relates to rotors, and more particularly to rotor airfoils of integrally bladed rotors.

Gas turbine engines are known and typically include a fan delivering air into a bypass duct for propulsion. The fan also delivers air into a compressor where air is compressed and delivered into a combustor. The air is mixed with fuel and ignited. Products of this combustion pass downstream over turbine rotors driving them to rotate. The turbine rotors, in turn, rotate compressor rotors and the fan rotor. The fan rotor and the turbine rotors include blades having airfoils that extend radially outward from a hub. Traditionally, rotor blades have been removable from the hub.

Integrally bladed rotors (IBRs) are used in some gas turbine engine applications, and are provided by a unitary structure that includes a hub from which a plurality of non-removable circumferentially arranged rotor blades radially extend. IBRs eliminate individual blade attachments. IBRs have been used for both fan and compressor applications.

IBR rotor blades may be subjected to high vibratory stress during gas turbine engine operation. Because IBR rotor blades are integrally formed with the rotor hub, that high vibratory stress may also extend to the rotor hub from which the blades extend.

SUMMARY

An integrally bladed rotor according to an example of the present disclosure includes a hub, and a plurality of rotor airfoils integrally formed with the hub, and extending radially outward from an outer platform of the hub. Each rotor airfoil has a main body that extends radially outward from a root to a tip. A first fillet has a first radius that provides a transition from the outer platform of the hub, and a second fillet situated adjacent to and radially outward of the first fillet, that provides a transition between the first fillet and the main body. The second fillet has a second radius that is less than the first radius.

In a further embodiment of any of the foregoing embodiments, for each of the airfoils, a ratio of the first radius to the second radius is from 1.2:1 to 4:1.

In a further embodiment of any of the foregoing embodiments, for each of the airfoils, a ratio of the first radius to the second radius is from 2:1 to 3:1.

In a further embodiment of any of the foregoing embodiments, for at least one of the rotor airfoils, the first and second fillets extend around a leading edge of the rotor airfoil, a trailing edge of the rotor airfoil, or both.

In a further embodiment of any of the foregoing embodiments, for at least one of the rotor airfoils, the first and second fillets extend around a majority of a perimeter of the root.

In a further embodiment of any of the foregoing embodiments, the first and second fillets meet at a rim, and wherein for at least one of the rotor airfoils, a height of the rim, defined as a radial distance from a beginning point of the first fillet, is 1%-20% of a maximum radial length of the airfoil between the beginning point and the tip.

In a further embodiment of any of the foregoing embodiments, the first and second fillets meet at a rim, and wherein for at least one of the rotor airfoils, a ratio of a maximum width of the rim measured in a dimension perpendicular to a mean camber line of the rotor airfoil to a width of the main body measured along the same dimension between respective points where the second fillet ends on opposing outer sides of the airfoil is greater than 1:1 and less than or equal to 3:1.

In a further embodiment of any of the foregoing embodiments, the integrally bladed rotor is part of a compressor stage of a gas turbine engine.

In a further embodiment of any of the foregoing embodiments, the integrally bladed rotor is part of a fan section of a gas turbine engine.

An integrally bladed rotor according to an example of the present disclosure includes a hub, and a plurality of rotor airfoils integrally formed with the hub, and extending radially outward from an outer platform of the hub. Each rotor airfoil has a main body that extends radially outward from a root to a tip. A first fillet has a first radius that provides a transition from the outer platform of the hub, and a second fillet situated adjacent to and radially outward of the first fillet, that provides a transition between the first fillet and the main body. The first and second fillets meet at a rim that provides a stepped platform between the first and second fillets, and a ratio of the first radius to the second radius is from 0.5:1 to 1.2:1.

A gas turbine engine according to an example of the present disclosure includes a compressor that has a plurality of stages, a fan operable to deliver air to the compressor, and a combustor operable to ignite a mixture of fuel and compressed air from the compressor. At least one of the stages has an integrally bladed rotor that has a hub and a plurality of rotor airfoils extending radially outward from the hub. Each of the rotor airfoils has a main body extending radially outward from a root to a tip, a first fillet that has a first radius that provides a transition from the outer platform of the hub, and a second fillet situated adjacent to and radially outward of the first fillet, that provides a transition between the first fillet and the main body. The second fillet that has a second radius that is less than the first radius.

In a further embodiment of any of the foregoing embodiments, the first and second fillets meet at a rim, and wherein the rim of at least one rotor airfoil of one of the stages has a different height defined as a radial distance from a beginning point of the first fillet, different maximum width measured along a dimension perpendicular to an airfoil mean camber line, or both than the rim of at least one rotor airfoil of another of the stages.

In a further embodiment of any of the foregoing embodiments, each of the plurality of the stages includes an integrally bladed rotor having rotor airfoils having the first fillet and second fillet.

In a further embodiment of any of the foregoing embodiments, the compressor includes a high pressure compressor and a low pressure compressor, and said at least one of the stages is a first stage of the high pressure compressor.

In a further embodiment of any of the foregoing embodiments, for each of the airfoils having the first and second fillet, a ratio of the first radius to the second radius is from 1.2:1 to 4:1.

In a further embodiment of any of the foregoing embodiments, for each of the airfoils having the first and second fillet, a ratio of the first radius to the second radius is from 2:1 to 3:1.

In a further embodiment of any of the foregoing embodiments, for at least one of the rotor airfoils having the first and second fillet, the first and second fillets extend around a leading edge of the rotor airfoil, a trailing edge of the rotor airfoil, or both.

In a further embodiment of any of the foregoing embodiments, for at least one of the rotor airfoils having the first and second fillet, the first and second fillets extend around a majority of a perimeter of the root.

In a further embodiment of any of the foregoing embodiments, for at least one of the rotor airfoils having the first and second fillet, the first and second fillets meet at a rim and a height of the rim, defined as a radial distance from a beginning point to the first fillet, is 1%-20% of a maximum radial length of the airfoil between the beginning point and the tip.

In a further embodiment of any of the foregoing embodiments, the first and second fillets meet at a rim, and wherein for at least one of the rotor airfoils, a ratio of a maximum width of the rim measured in a dimension perpendicular to a mean camber line of the rotor airfoil to a width of the main body measured along the same dimension between respective points where the second fillet ends on opposing outer sides of the airfoil is greater than 1:1 and less than or equal to 3:1.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
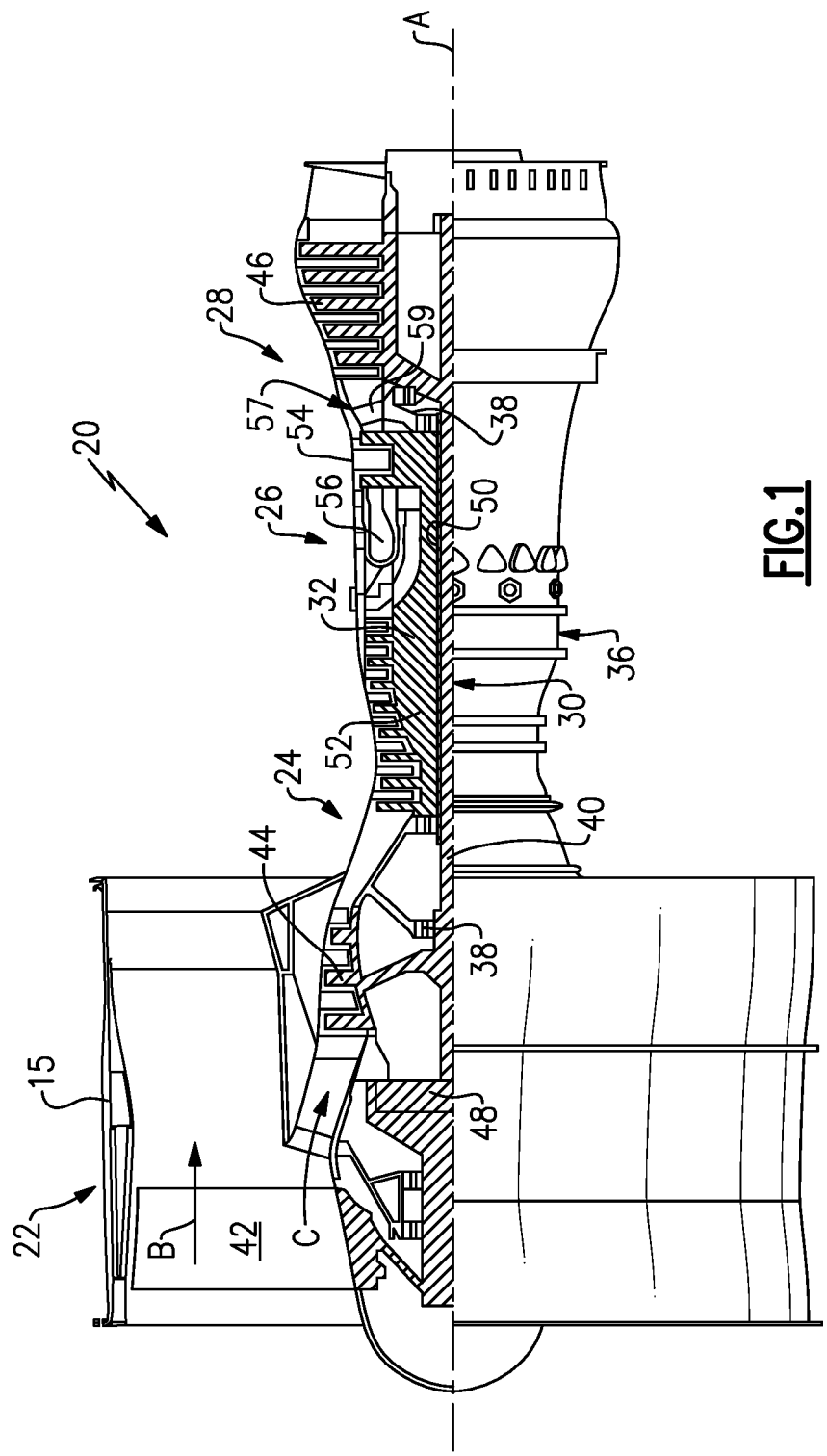
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

The low pressure compressor 44, high pressure compressor 52, and/or fan section 22 of the gas turbine engine 20 may include one or more integrally bladed rotors (IBRs).

Figure 2:
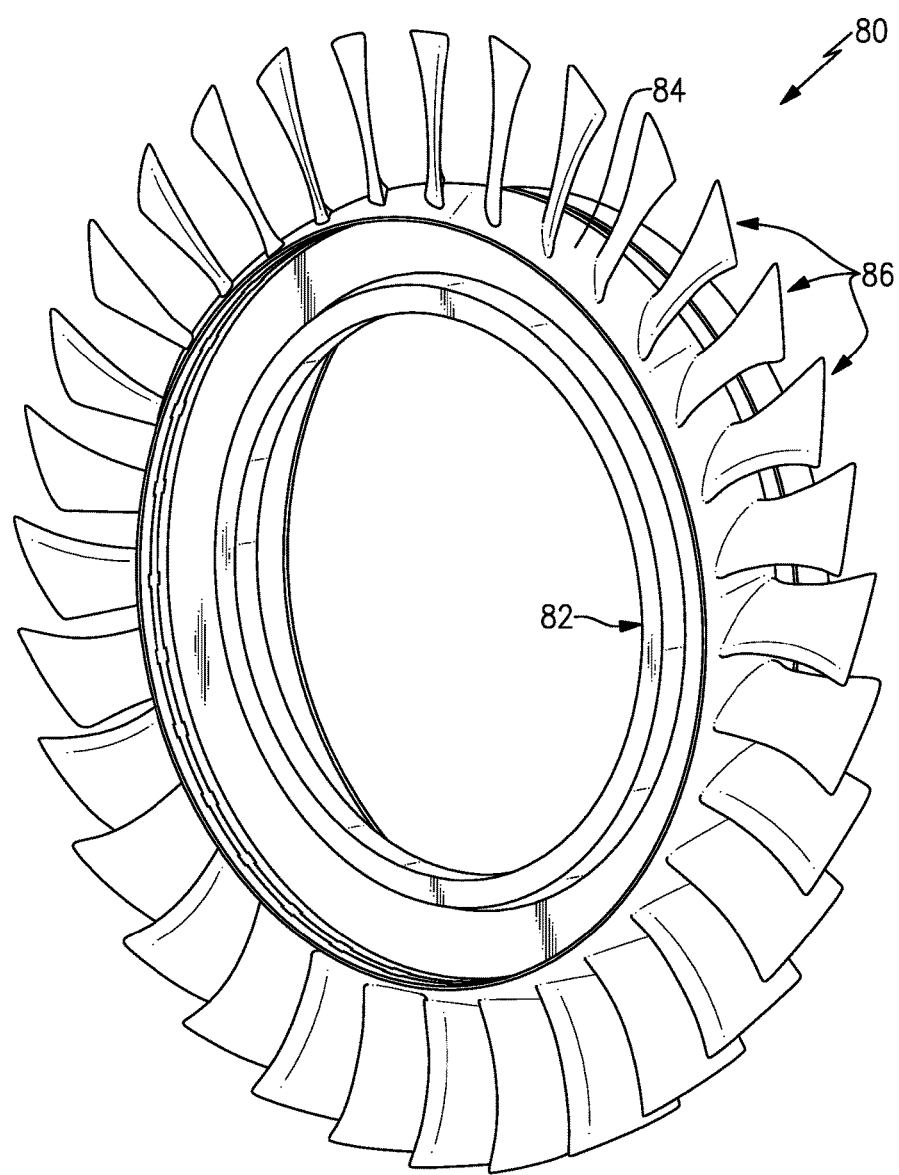
FIG. 2 is a schematic view of an example integrally bladed rotor (IBR).

FIG. 2 is a schematic view of an example IBR 80 that includes a hub 82 having an outer platform 84. A plurality of rotor airfoils 86 extend radially outward from the platform 84, and are circumferentially spaced apart from each other around the hub 82.

Figure 3:
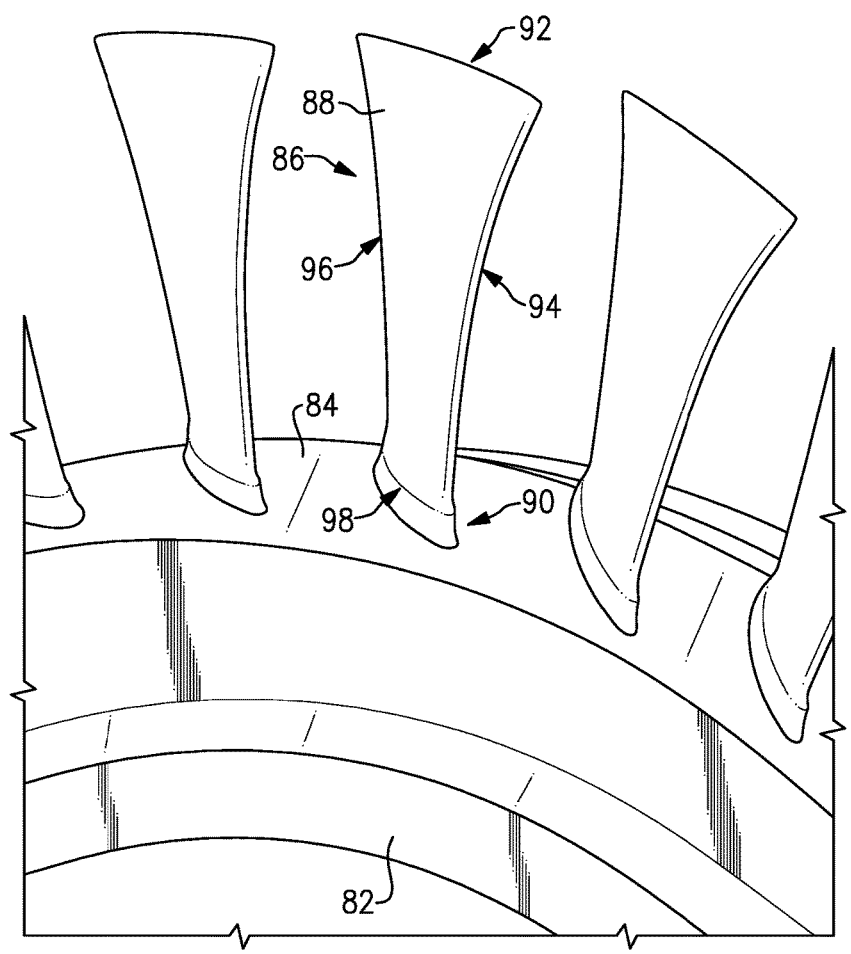
FIG. 3 illustrates a first view of an example rotor airfoil from the IBR of FIG. 2.

Referring now to FIG. 3, each rotor airfoil 86 includes a main body 88 that extends radially outward from a root 90 to a tip 92. Each rotor airfoil 86 also extends between a leading edge 94 and a trailing edge 96. Each rotor airfoil 86 includes a rim 98 proximate to the root 90.

Figure 4:
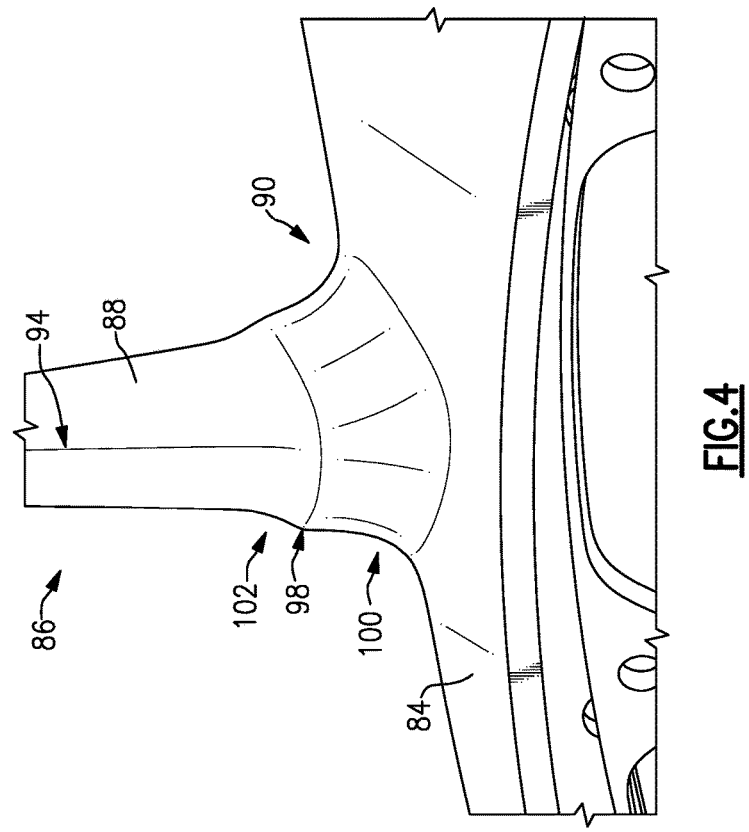
FIG. 4 illustrates a second view of an example rotor airfoil from the IBR of FIG. 2.

Referring now to FIG. 4, a first fillet 100 provides a transition between the outer platform 84 of the hub 82 and the rim 98, and a different second fillet 102 provides a transition between the rim 98 and the main body 88. The second fillet 102 is situated adjacent to and radially outward of the first fillet 100. Together, the fillets 100, 102 provide a double fillet configuration for the rotor airfoil 86. The main body 88, rim 98, and first and second fillets 100, 102 are integrally formed with the hub 82. In some examples, the rim 98 could be said to provide a stepped platform.

Rotor airfoils in a gas turbine engine may be subjected to high vibratory stresses at the airfoil root during engine operation. This is a particular challenge for IBRs, because the rotor airfoil is integral to the hub. If a crack were to form in a rotor airfoil of a prior art IBR during a high vibratory stress situation, such a crack may extend into the hub.

The rim 98 and fillets 100, 102 provide an increased stiffness. Due to the relative stiffness increase, vibratory stress of the rotor airfoils 86 will tend to concentrate in the second fillet 102, while steady stress will tend to concentrate in the first fillet 100. This physical separation minimizes an amount of vibratory stress that extends to the rotor hub 82, and reduces the possibility that a crack starting in a rotor airfoil 86 due to high vibratory stress will propagate into the rotor hub 82 and cause a disc fracture.

Figure 5:
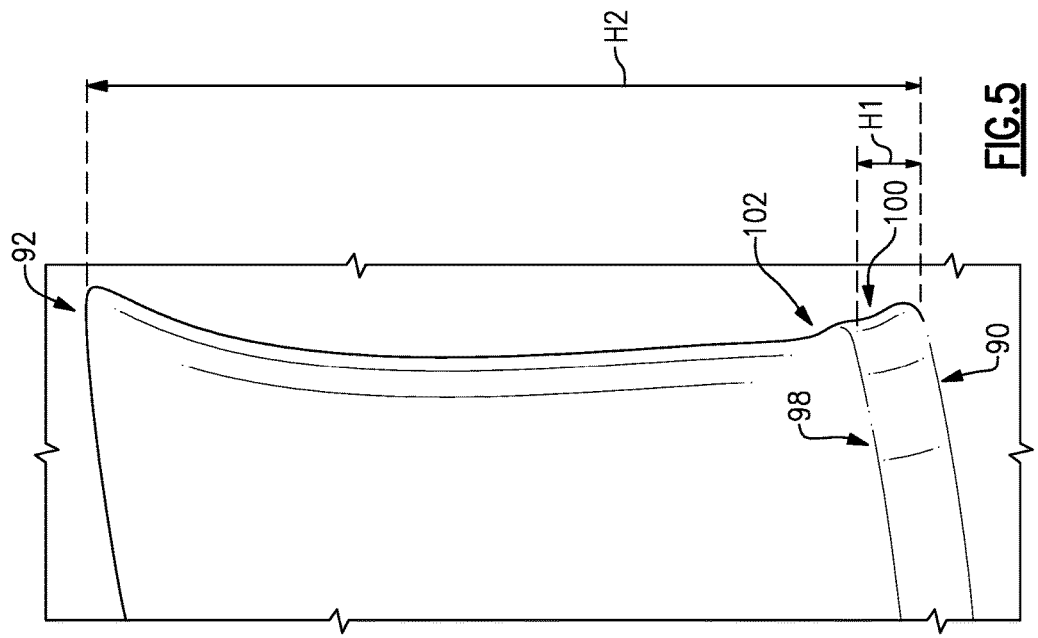
FIG. 5 illustrates a third view of an example rotor airfoil from the IBR of FIG. 2.

FIG. 5 illustrates a maximum radial length H2 of rotor airfoil 86 as measured between from its root 90, at a point P1 where the first fillet 100 begins (see FIG. 7), to its tip 92. FIG. 5 also shows a height H1 of the rim 98, defined as a radial distance from a beginning point P1 of the first fillet 100. In one example, the height H1 is 1%-20% of the height H2. In a further example, the height H1 is 1-10% of the height H2.

Figure 6A:
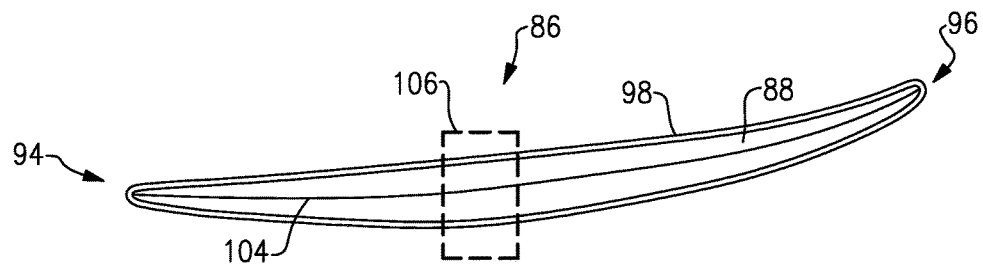
FIGS. 6A-B are schematic, cross sectional views of an example rotor airfoil from the IBR of FIG. 2.

FIG. 6A schematically illustrates a cross sectional view of an example rotor airfoil 86, including a mean camber line 104 that extends between the leading edge 94 and trailing edge 96 of the rotor airfoil 86.

Figure 6B:
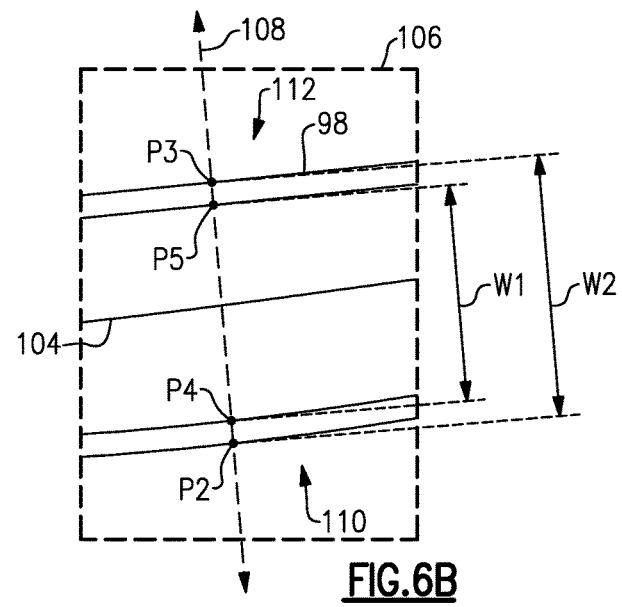

FIG. 6B depicts an enlarged section 106 of the rotor airfoil 86. A maximum width W2 of the rim 98 is measured in a dimension 108 between points P2 and P3, and is measured perpendicular to the mean camber line 104. The points P2 and P3 are at the outermost points of the rim 98, and are on opposing sides 110, 112 of the rotor airfoil 86. A maximum width W1 of the main body 88 is measured from a point P4 where the second fillet 102 ends on side 110 of the rotor airfoil 86 to a corresponding point P5 where the second fillet 102 ends on opposing side 112 of the rotor airfoil 86 along the dimension 108. In one example, a ratio of W2:W1 is greater than 1:1 and less than or equal to 3:1.

In some examples, like the one depicted in FIG. 6A, the rim 98 and the first and second fillets 100, 102 extend around an entire perimeter of the root 90. In other examples, the rim 98 and the fillets 100, 102 only extend around a portion of a perimeter of the root 90 (e.g., a major portion of the perimeter), but do not extend around the entire perimeter. In one such example, the rim 98 and fillets 100, 102 extend at least around the leading edge 94 of the rotor airfoil 86. In the same or another example, the rim 98 and fillets 100, 102 extend at least around the trailing edge 96 of the rotor airfoil 86.

Figure 7:
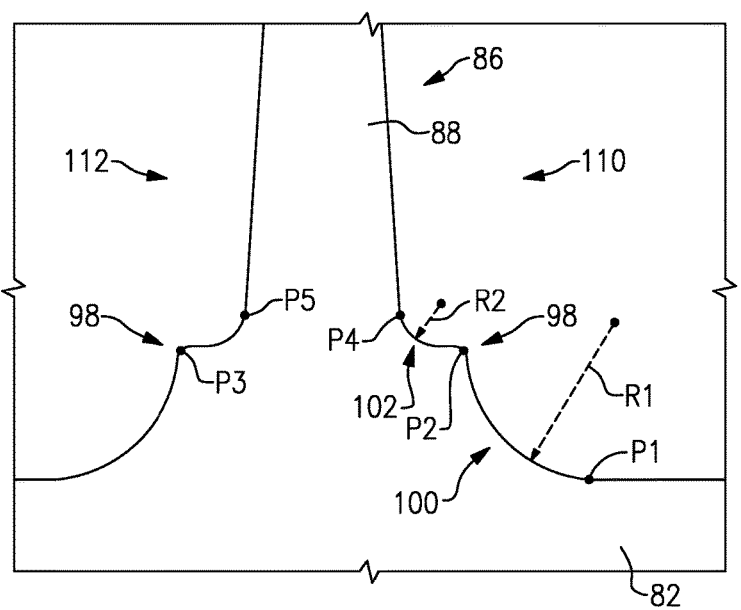
FIG. 7 is a schematic view of an example rotor airfoil from the IBR of FIG. 2.

FIG. 7 illustrates a radius R1 of the first fillet 100 and a radius R2 of the second fillet 102. In the example of FIG. 7, R1 is greater than R2. In one example, a ratio of the first radius R1 to the second radius R2 is from 1.2:1 to 4:1. In a further example, the ratio of R1:R2 is from 2:1 to 3:1.

In some examples, R1 is less than or equal to R2. In one particular example, a ratio of the first radius R1 to the second radius R2 is from 0.5:1 to 1.2:1.

The integrally bladed rotor 80 may be incorporated into the low pressure compressor 44, the high pressure compressor 52, and/or fan section 22 of the gas turbine engine 20, for example. In one particular example, the integrally bladed rotor 80 is incorporated as at least a first stage of the high pressure compressor 52. In some examples, multiple ones of the stages of the high pressure compressor 52 or the low pressure compressor 44 include an integrally bladed rotor including the rim 98 and first and second fillets 100, 102. In some examples the rim 98 of a first compressor stage has a different height (as in FIG. 5), maximum width measured perpendicular to mean camber line 104 (as in FIG. 6B), or both than the rim 98 of a second compressor rotor stage.

Although example embodiments have been disclosed, a worker of ordinary skill in this art would recognize that certain modifications would come within the scope of this disclosure. For that reason, the following claims should be studied to determine the scope and content of this disclosure.

What is claimed is:
1. An integrally bladed rotor comprising:
   a hub; and
   a plurality of rotor airfoils integrally formed with the hub, and extending radially outward from an outer platform of the hub, each rotor airfoil comprising:
      a main body extending radially outward from a root to a tip;
      a first fillet having a first radius and providing a transition from the outer platform of the hub; and
      a second fillet situated adjacent to and radially outward of the first fillet, and providing a transition between the first fillet and the main body, the second fillet having a second radius that is less than the first radius;
      wherein the first and second fillets meet at a rim, and wherein for at least one of the rotor airfoils, a height of the rim, defined as a radial distance from a beginning point of the first fillet, is 1%-20% of a maximum radial length of the airfoil between the beginning point and the tip.

2. The integrally bladed rotor of claim 1, wherein for each of the airfoils, a ratio of the first radius to the second radius is from 1.2:1 to 4:1.

3. The integrally bladed rotor of claim 2, wherein for each of the airfoils, a ratio of the first radius to the second radius is from 2:1 to 3:1.

4. The integrally bladed rotor of claim 1, wherein for at least one of the rotor airfoils, the first and second fillets extend around a leading edge of the rotor airfoil, a trailing edge of the rotor airfoil, or both.

5. The integrally bladed rotor of claim 1, wherein for at least one of the rotor airfoils, the first and second fillets extend around a majority of a perimeter of the root.

6. The integrally bladed rotor of claim 1, wherein the integrally bladed rotor is part of a compressor stage of a gas turbine engine.

7. The integrally bladed rotor of claim 1, wherein the integrally bladed rotor is part of a fan section of a gas turbine engine.

8. An integrally bladed rotor comprising:
a hub; and
a plurality of rotor airfoils integrally formed with the hub, and extending radially outward from an outer platform of the hub, each rotor airfoil comprising:
a main body extending radially outward from a root to a tip;
a first fillet having a first radius and providing a transition from the outer platform of the hub; and
a second fillet situated adjacent to and radially outward of the first fillet, and providing a transition between the first fillet and the main body, the second fillet having a second radius that is less than the first radius;
wherein the first and second fillets meet at a rim, and wherein for at least one of the rotor airfoils, a ratio of a maximum width of the rim measured in a dimension perpendicular to a mean camber line of the rotor airfoil to a width of the main body measured along the same dimension between respective points where the second fillet ends on opposing outer sides of the airfoil is greater than 1:1 and less than or equal to 3:1.

9. An integrally bladed rotor comprising:
a hub; and
a plurality of rotor airfoils integrally formed with the hub, and extending radially outward from an outer platform of the hub, each rotor airfoil comprising:
a main body extending radially outward from a root to a tip;
a first fillet having a first radius and providing a transition from the outer platform of the hub; and
a second fillet situated adjacent to and radially outward of the first fillet, and providing a transition between the first fillet and the main body;
wherein the first and second fillets meet at a rim that provides a stepped platform between the first and second fillets, and a ratio of the first radius to the second radius is from 0.5:1 to 1.2:1.

10. A gas turbine engine comprising:
a compressor comprising a plurality of stages;
a fan operable to deliver air to the compressor; and
a combustor operable to ignite a mixture of fuel and compressed air from the compressor;
wherein at least one of the stages comprises an integrally bladed rotor having a hub and a plurality of rotor airfoils extending radially outward from the hub, each of the rotor airfoils including:
a main body extending radially outward from a root to a tip;
a first fillet having a first radius and providing a transition from the outer platform of the hub; and
a second fillet situated adjacent to and radially outward of the first fillet, and providing a transition between the first fillet and the main body, the second fillet having a second radius that is less than the first radius;
wherein the first and second fillets meet at a rim, and wherein the rim of at least one rotor airfoil of one of the stages has a different height defined as a radial distance from a beginning point of the first fillet, different maximum width measured along a dimension perpendicular to an airfoil mean camber line, or both than the rim of at least one rotor airfoil of another of the stages.

11. The gas turbine engine of claim 10, wherein each of the plurality of the stages comprises an integrally bladed rotor comprising rotor airfoils having the first fillet and second fillet.

12. The gas turbine engine of claim 10, wherein the compressor comprises a high pressure compressor and a low pressure compressor, and said at least one of the stages is a first stage of the high pressure compressor.

13. The gas turbine engine of claim 10, wherein for each of the airfoils having the first and second fillet, a ratio of the first radius to the second radius is from 1.2:1 to 4:1.

14. The gas turbine engine of claim 10, wherein for each of the airfoils having the first and second fillet, a ratio of the first radius to the second radius is from 2:1 to 3:1.

15. The gas turbine engine of claim 10, wherein for at least one of the rotor airfoils having the first and second fillet, the first and second fillets extend around a leading edge of the rotor airfoil, a trailing edge of the rotor airfoil, or both.

16. The gas turbine engine of claim 10, wherein for at least one of the rotor airfoils having the first and second fillet, the first and second fillets extend around a majority of a perimeter of the root.

17. The gas turbine engine of claim 10, wherein for at least one of the rotor airfoils, a height of the rim, defined as a radial distance from a beginning point to the first fillet, is 1%-20% of a maximum radial length of the airfoil between the beginning point and the tip.

18. The gas turbine engine of claim 10, wherein for at least one of the rotor airfoils, a ratio of a maximum width of the rim measured in a dimension perpendicular to a mean camber line of the rotor airfoil to a width of the main body measured along the same dimension between respective points where the second fillet ends on opposing outer sides of the airfoil is greater than 1:1 and less than or equal to 3:1.

* * * * *